US009296555B2

(12) United States Patent
Kawka et al.

(10) Patent No.: US 9,296,555 B2
(45) Date of Patent: *Mar. 29, 2016

(54) COMPOSITE SHEET AND CARGO CONTAINER COMPRISING SAME

(71) Applicant: E I DU PONT DE NEMOURS AND COMPANY, Wilmington, DE (US)

(72) Inventors: Dariusz Wlodzimierz Kawka, Midlothian, VA (US); Karl K. Chang, Midlothian, VA (US)

(73) Assignee: E I DU PONT DE NEMOURS AND COMPANY, Wilmington, DE (US)

(*) Notice: Subject to any disclaimer, the term of this patent is extended or adjusted under 35 U.S.C. 154(b) by 122 days.

This patent is subject to a terminal disclaimer.

(21) Appl. No.: 14/071,988

(22) Filed: Nov. 5, 2013

(65) Prior Publication Data
US 2014/0154444 A1 Jun. 5, 2014

Related U.S. Application Data

(60) Provisional application No. 61/732,542, filed on Dec. 3, 2012.

(51) Int. Cl.
*B65D 25/14* (2006.01)
*B65D 88/14* (2006.01)
(Continued)

(52) U.S. Cl.
CPC ............... *B65D 88/14* (2013.01); *B32B 5/022* (2013.01); *B32B 5/024* (2013.01); *B32B 7/045* (2013.01);
(Continued)

(58) Field of Classification Search
CPC ...... B32B 27/288; B32B 27/32; B32B 27/36; B32B 27/365; B32B 27/40; B32B 5/022; B32B 5/024; B32B 7/045; B32B 7/08; B32B 7/12; B65D 88/14; B65D 90/022; B65D 24/145; Y10T 428/1369; Y10T 442/668
USPC ........... 428/34.1, 34.3, 34.5, 34.6, 34.7, 35.7, 428/35.9, 36.1, 36.2, 36.4, 36.91, 219, 220; 442/239, 243, 244, 246, 248, 255, 389; 206/736, 321, 449, 389, 484, 524.1, 206/527; 220/560.01, 560.02, 1.5, 476, 220/62.11, 62.19, 660, 890; 52/309.1
See application file for complete search history.

(56) References Cited

U.S. PATENT DOCUMENTS 3,094,511 A 6/1963 Hill, Jr. et al.
3,354,127 A 11/1967 Hill, Jr. et al.
(Continued)

FOREIGN PATENT DOCUMENTS

WO 0032388 A2 6/2000
WO 0232663 A1 4/2002

OTHER PUBLICATIONS

International Search Report, European Patent Office, Rijswijk in PCT/2013/068365, PCT Counterpart of the Present U.S. Appl. No. 14/071,988, Mazet, Jean-Francois, Authorized Officer, May 19, 2014.

(Continued)

*Primary Examiner* — Arti Singh-Pandey

(57) ABSTRACT

This invention is directed to a non-rigid composite sheet comprising in order (i) a first component having an areal density of from 88 to 678 gsm comprising a first fabric of filamentary yarns having a tenacity of at least 11 g/dtex and a UV and weather impervious first polymeric layer. (ii) a second component having an areal density of from 30 to 237 gsm comprising a flame resistant substrate and an inorganic refractory layer and (iii) a third component having an areal density of from 88 to 678 gsm comprising a second fabric of filamentary yarns having a tenacity of at least 11 g/dtex and an impact and scratch resistant second polymeric layer, the second fabric of the third component being adjacent to the refractory layer of the second component.

11 Claims, 6 Drawing Sheets

(51) Int. Cl.
  *B32B 5/02* (2006.01)
  *B32B 7/04* (2006.01)
  *B32B 7/08* (2006.01)
  *B32B 7/12* (2006.01)
  *B32B 19/04* (2006.01)
  *B32B 19/06* (2006.01)
  *B32B 27/10* (2006.01)
  *B32B 27/12* (2006.01)
  *B32B 27/28* (2006.01)
  *B32B 27/32* (2006.01)
  *B32B 27/36* (2006.01)
  *B32B 27/40* (2006.01)
  *B65D 90/02* (2006.01)

(52) U.S. Cl.
  CPC ... *B32B 7/08* (2013.01); *B32B 7/12* (2013.01); *B32B 19/045* (2013.01); *B32B 19/06* (2013.01); *B32B 27/10* (2013.01); *B32B 27/12* (2013.01); *B32B 27/281* (2013.01); *B32B 27/286* (2013.01); *B32B 27/288* (2013.01); *B32B 27/32* (2013.01); *B32B 27/36* (2013.01); *B32B 27/365* (2013.01); *B32B 27/40* (2013.01); *B65D 90/022* (2013.01); *B32B 2262/101* (2013.01); *B32B 2307/306* (2013.01); *B32B 2307/3065* (2013.01); *B32B 2439/62* (2013.01); *Y10T 428/1369* (2015.01); *Y10T 442/668* (2015.04)

(56) References Cited

U.S. PATENT DOCUMENTS

| | | |
|---|---|---|
| 3,673,143 A | 6/1972 | Bair et al. |
| 3,767,756 A | 10/1973 | Blades |
| 3,819,587 A | 6/1974 | Kwoleck |
| 3,869,429 A | 3/1975 | Blades et al. |
| 3,869,430 A | 3/1975 | Blades et al. |
| 4,172,938 A | 10/1979 | Mera et al. |
| 4,698,267 A | 10/1987 | Tokarsky et al. |
| 4,729,921 A | 3/1988 | Tokarsky et al. |
| 5,026,456 A | 6/1991 | Hesler et al. |
| 5,084,136 A | 1/1992 | Haines |
| 5,223,094 A | 6/1993 | Kirayoglu et al. |
| 5,314,742 A | 5/1994 | Kirayoglu et al. |
| 8,292,027 B2 | 10/2012 | Richardson, III et al. |
| 2012/0128959 A1 | 5/2012 | Fernando et al. |
| 2014/0217092 A1* | 8/2014 | Kawka et al. .................. 220/1.5 |

OTHER PUBLICATIONS

"Aramid & High Performance Fabrics", Technical Fabrics Handbook, Aug. 2006, p. 52 & 53, Hexcel Reinforcements, Anderson, SC.

"Scrim" definition, Hoechst Celanese Dictionary of Fiber & Textile Technology, 1990, p. 136, Hoechst Celanese Corporation, Charlotte, NC.

* cited by examiner

COMPOSITE SHEET AND CARGO CONTAINER COMPRISING SAME

BACKGROUND

1. Field of the Invention

This invention pertains to a non-rigid composite sheet having fire resistant properties. The sheet is useful as walls in a cargo container, particularly containers used in aircraft.

2. Description of Related Art

Cargo containers or unitary load devices (ULDs) are used in aircraft, ships, road vehicles and railcars to carry goods. For economic reasons there is a desire to reduce the weight of an empty container while minimizing its operational cost. Shipment of flammable materials in air cargo containers is creating a serious safety issue for airlines and air cargo carriers. There is increasing concern about the capability of existing containers to contain the spread of fire when the ignition source is the cargo itself. An example of such an ignition source is a lithium-ion battery. Consequently, to prevent possible human casualties and cargo equipment losses, airlines and air cargo carriers are looking for flame resistant cargo containers to contain fires that may originate within the containers. A tightening of regulatory requirements is expected over the next few years. There is therefore a need to provide a light weight cargo container having enhanced capability to contain the spread of fire from within the container that meet stringent durability standards while providing an extended lifetime with minimum maintenance.

U.S. Pat. No. 8,292,027 to Richardson et al describes a composite laminate comprising in order (a) a flame retardant polymeric moisture barrier (b) an inorganic platelet layer and (c) a flame retardant thermoplastic film layer.

SUMMARY OF THE INVENTION

This invention is directed to a non-rigid composite sheet comprising in order
(i) a first component having an areal density of from 88 to 678 gsm comprising a first fabric of filamentary yarns having a tenacity of at least 11 g/dtex and a UV and weather impervious first polymeric layer,
(ii) a second component having an areal density of from 30 to 237 gsm comprising a flame resistant substrate and an inorganic refractory layer, and
(iii) a third component having an areal density of from 88 to 678 gsm comprising a second fabric of filamentary yarns having a tenacity of at least 11 g/dtex and an impact and scratch resistant second polymeric layer, the second fabric of the third component being adjacent to the refractory layer of the second component.

DETAILED DESCRIPTION

Figure 1A:
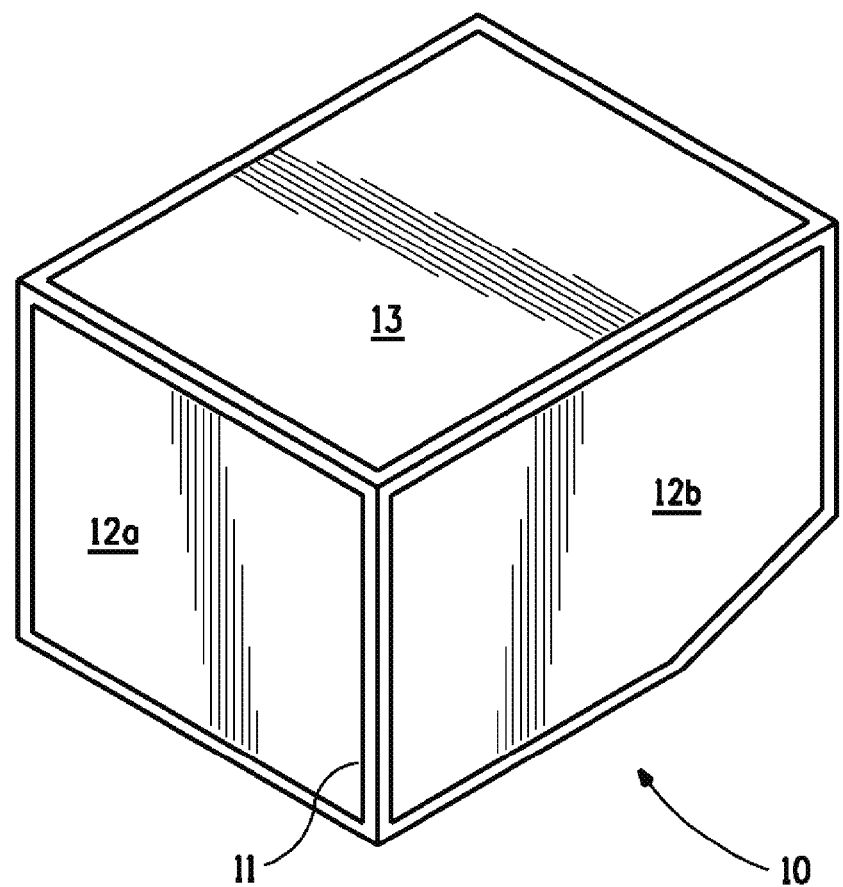
FIGS. 1A and 1B show a perspective of a cargo container.

FIG. 1A shows at 10, a perspective of a fire resistant cargo container suitable for aircraft, seagoing vessels and the like for containing the effects of a fire within the cargo container comprising a frame assembly 11, side walls 12a, and 12b and a top 13. FIG. 2B shows a container comprising a frame assembly 11, a plurality of side walls 12a to 12d, a top 13 and a base 14. The side walls and ceiling comprise a non-rigid flame resistant composite sheet.

Non-Rigid Flame Resistant Composite Sheet.

Figure 2A:
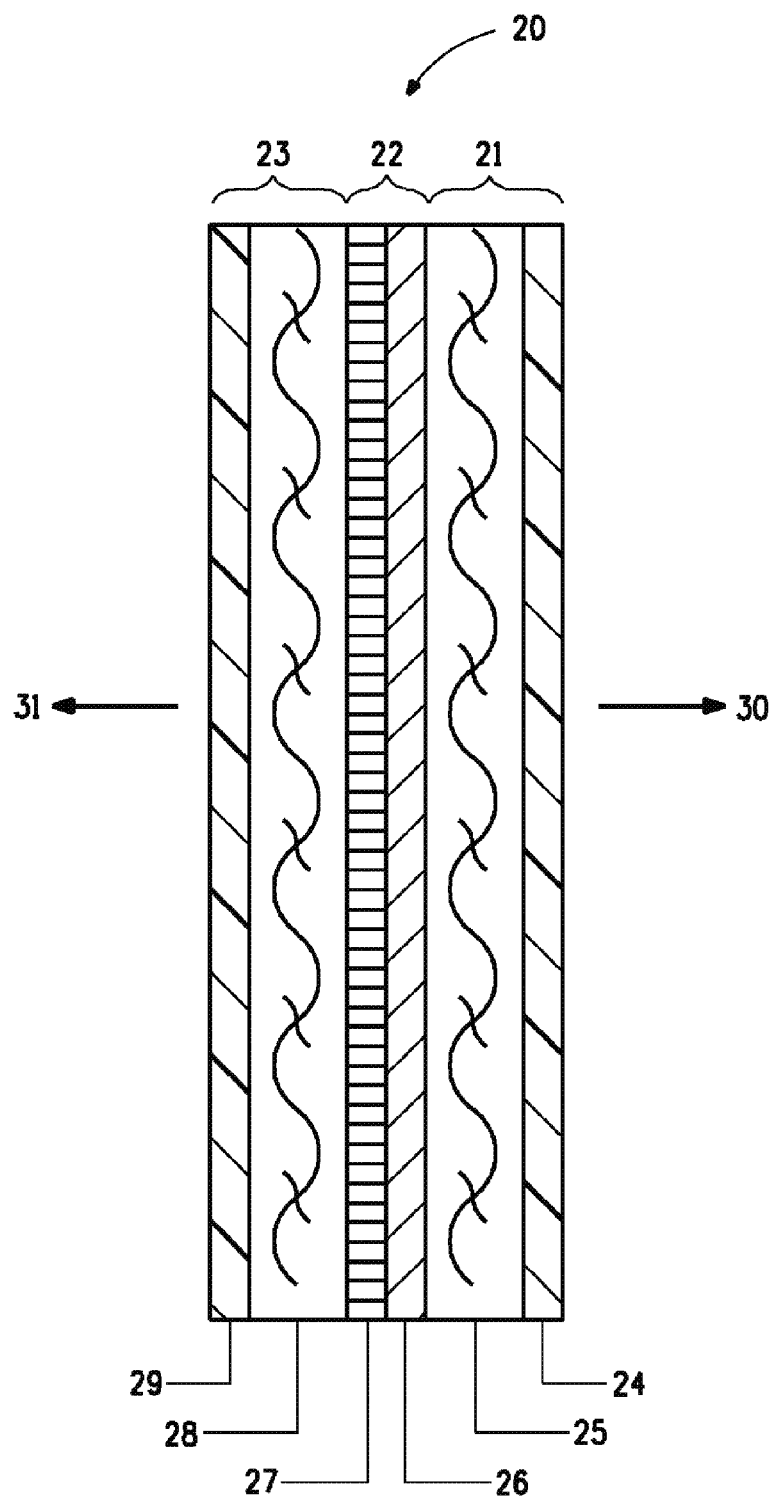
FIGS. 2A and 2D show a cross section through embodiments of a non-rigid composite sheet of this invention.
Figure 2B:
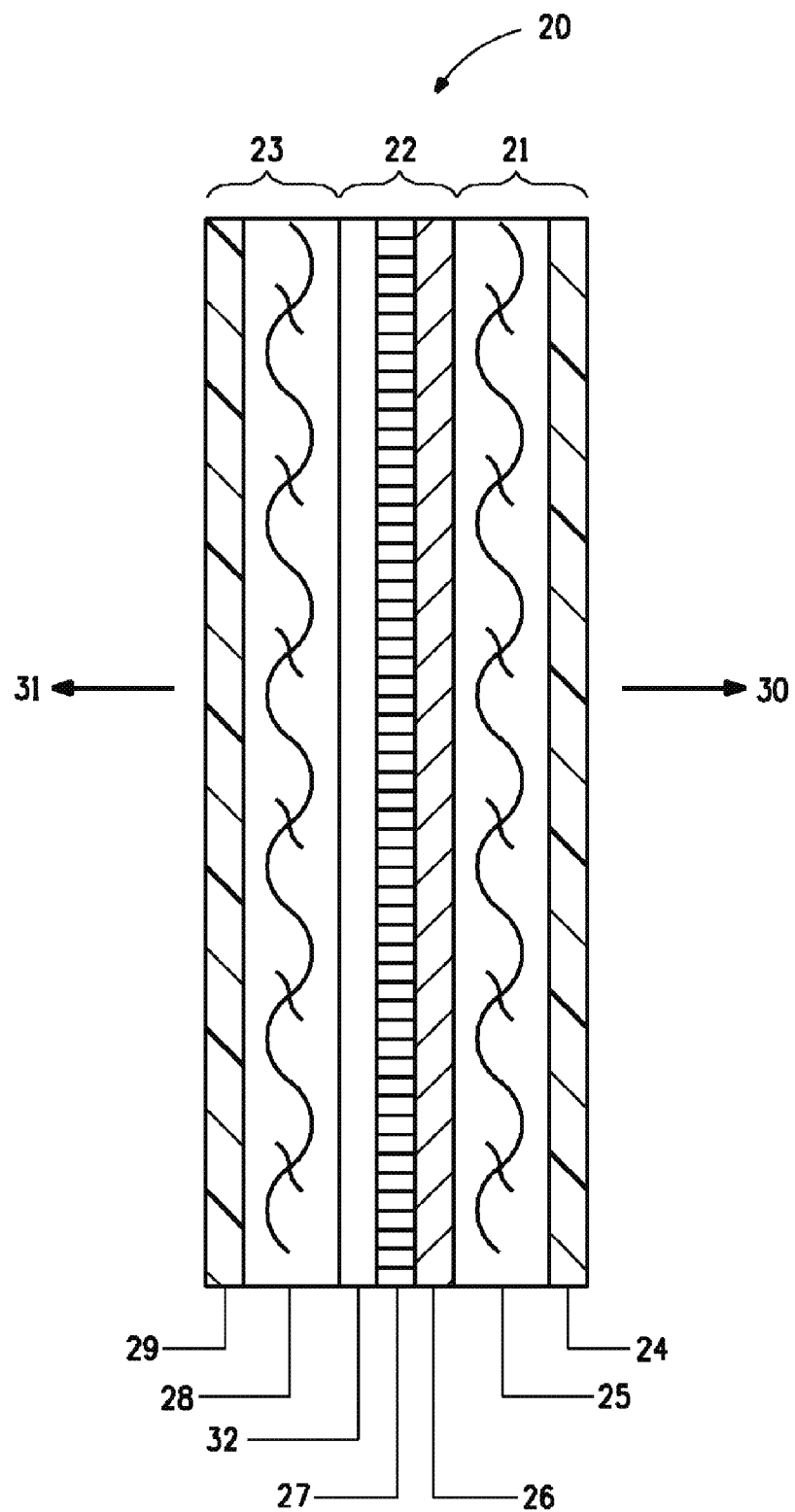

FIG. 2A shows generally at 20 a cross section through the non-rigid flame resistant composite sheet which comprises in order a first component 21, a second component 22 and a third component 23. The sheet is arranged between the frames of a cargo container such that the third component is the innermost component 31 facing towards the cargo and the first component is the outermost component 30 facing away from the cargo.

Preferably, the composite sheet has a break strength of at least 350 N/cm (200 lb. per in.) when tested according to ASTM D3039/D3039M-08. In some embodiments, the composite sheet has a break strength of at least 525 N/cm (300 lb. per in.) or even of at least 700 N/cm (400 lb. per in.) Some embodiments of the composite sheet provides a penetration resistance to a direct flame having a temperature of 927° C., +/−38° C. (1700° F., +/−100° F.) The specification also requires no flame penetration of the specimen within five minutes after application of the flame source, and with the peak temperature measured at 101.6 mm (4 inches) above the upper surface of the horizontal test sample not exceeding 204° C. (400° F.) when tested according to a flame penetration FAA test method 14 CFR 25.855 Appendix F Part III—Test Method To Determine Flame Penetration Resistance of Cargo Compartment Liner (ceiling position).

Preferably, the composite sheet can withstand exposure to a temperature range of from −50° C. to +80° C. without compromising its reliability and durability over the life span of the end product.

In some embodiments, the first, second and third components may optionally be bonded to each other by means such as adhesives or thermal lamination.

First Component

The first component 21 has an areal density of from 88 to 678 gsm (2.6 to 20 oz. per sq. yd.) and comprises a first fabric 25 of filamentary yarns having a tenacity of at least 11 grams per dtex (10 grams per denier) and a first polymeric layer 24, the polymeric layer being the outermost layer of the composite sheet. The polymeric layer provides chemical and environmental (i.e. weather and UV) resistance to both physical and chemical attack and permeation by liquids.

By chemical and environmental/weather resistant is meant that the ability of the polymeric layer to withstand, without excessive degradation, the effects of wind, rain, contaminants such as acidic and/or oily residues found in a typical industrial areas, and sun exposure. Preferably, the polymeric layer has an enhanced ability to resist damage by chemical reactivity, or solvent action, with hydrocarbons, chemicals, ozone, bacteria, fungus, and moisture, as well as skin oils, typically associated with operation and maintenance of a commercial aircraft.

By UV resistant is meant that, when exposed to ultraviolet radiation, the polymeric layer retains its appearance and physical integrity without an excessive degradation of its flexibility and mechanical properties (i.e. brittleness). Preferably, the polymeric layer blocks at least 95% of UV rays, more preferably at least 98% and most preferably 100% of UV rays. UV imperviousness of the first polymeric film can be further mitigated by inclusion of additives in the polymeric material. Examples of such additives include fillers, colors, stabilizers and lubricants. The outer surface of the first polymeric layer that is not in contact with the first fabric may optionally be coated or treated with a UV blocking material.

Ultraviolet (UV) is an invisible band of radiation at the upper end of the visible light spectrum. At wavelengths ranging from 10 to 400 nm, ultraviolet (UV) starts at the end of visible light and ends at the beginning of X-rays. As the primary exposure of the composite sheet to ultraviolet light is the sun, the most critical UV resistance is that to the lower-frequency, longer-wavelength rays.

Preferably, the outer polymeric layer has a soft, non-plastic feel that is ideal for products that come in contact with the human skin and maintains its toughness and flexibility over a wide temperature range, even at temperatures as low as −50° C. (−60° F.), over the life span of the product.

In some embodiments, the outer surface of the first polymeric layer, that is to say the surface not in contact with the first fabric, has a release value of no more than 263 N/m (1.5 lb/in), more preferably no more than 438 N/m (2.5 lb/in) when measured according to ASTM D2724-07 (2011)e1 Standard Test Methods for Bonded, Fused, and Laminated Apparel Fabrics. This facilitates cleaning, label removal etc.

In some embodiments, the first fabric layer may be bonded to the first polymeric layer by means such as an adhesive, thermal bonding or by fasteners.

In some embodiments, the bond strength between the first fabric and the first polymeric layer is at least 263 N/m (1.5 lb/in). In another embodiment, the bond strength between the first fabric and the first polymeric layer is at least 438 N/m (2.5 lb/in), or even at least 876 N/m (5 lb/in).

The adhesive layer may be a thermoplastic or thermoset resin. Thermoset resins include epoxy, epoxy novolac, phenolic, polyurethane, and polyimide. Thermoplastic resins include polyester, polyetherketone, polyetheretherketone, polyetherketoneketone, polyethersulfone, and polyolefin. Thermoplastic resins are preferred.

Preferably, the adhesive layer may optionally contain up to 40 weight percent of a flame retardant ingredient. Suitable flame retardant ingredients include antimony trioxide, halogenated flame retardants including tetrabromobisphenol A, polybrominated biphenyls, pentabrominateddiphenylether (oxide), octabrominateddiphenylether(oxide), decabrominateddiphenylyether(oxide) and hexabromocyclododecane. Phosphorus containing flame retardants are also widely used.

Preferably, the adhesive layer blocks at least 95% of UV rays, more preferably at least 98% and most preferably 100% of UV rays. The adhesive may further comprise fillers, colors, stabilizers, and other performance enhancing additives.

The adhesive must be capable of activation at a temperature in the range of 75 to 200 degrees C. In some embodiments, the activation range is from 120 to 140 degrees C. By activation we mean that for a thermoset resin, the resin must cure and bond to the polymeric layer and the fabric within the specified temperature range. For a thermoplastic resin, activation means that the resin softens and flows sufficiently to bond to the polymeric layer and the fabric. The adhesive bond between the first polymeric layer and the first fabric is at least 263 N/m (1.5 lb/in). In some embodiments, the adhesive bond between the first polymeric layer and the first fabric is at least 438 N/m (2.5 lb/in), or even 876 N/m (5 lb/in).

Second Component

Figure 2C:
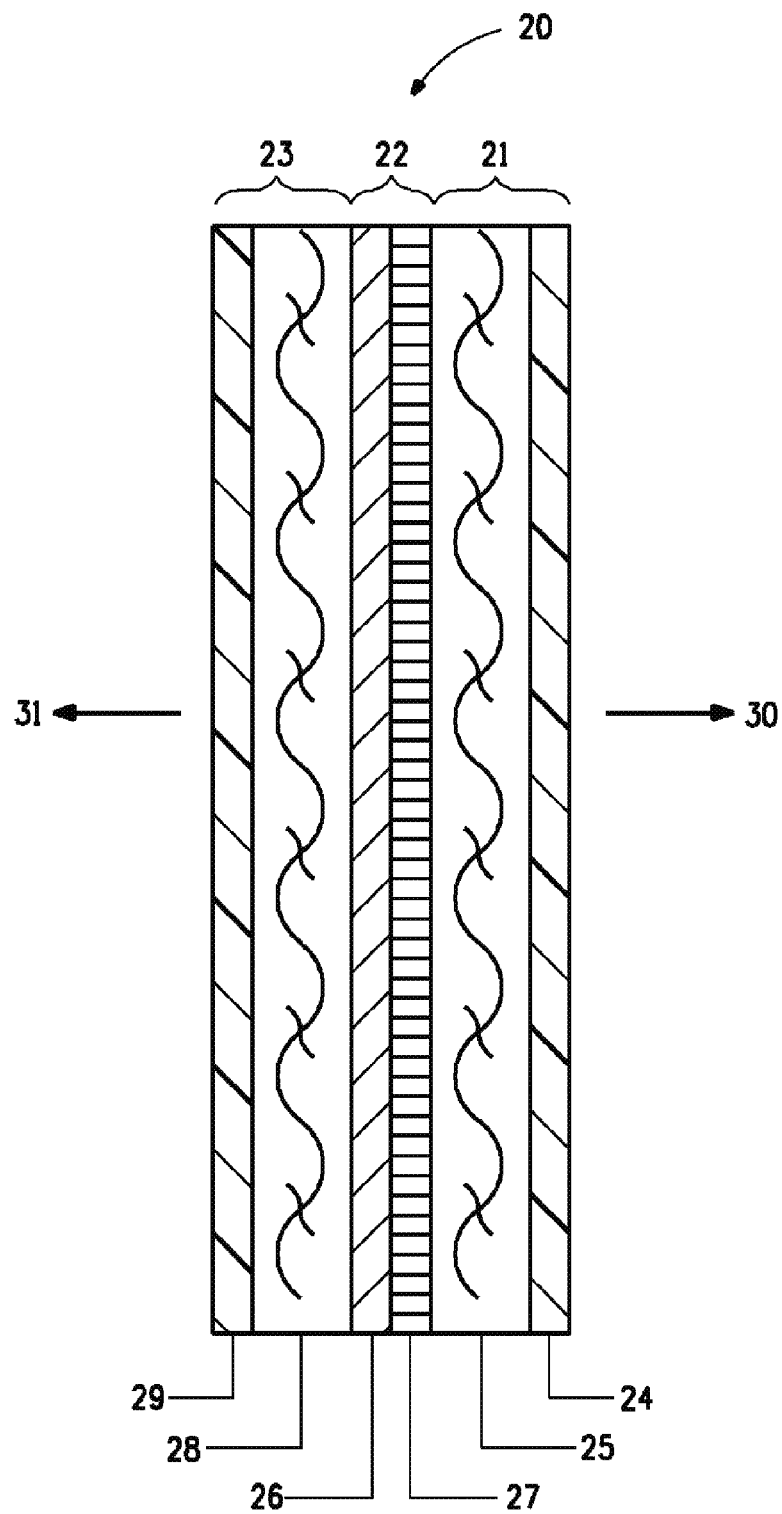

The second component has an areal density of from 30 to 237 gsm (0.9 to 7 oz. per sq. yd.) and comprises a flame resistant substrate 26 and an inorganic refractory layer 27. In some embodiments, as shown in FIG. 2A, the substrate 26 of the second component is adjacent to the first fabric 25 of the first component. In other embodiments, as shown in FIG. 2C, the substrate 26 of the second component is adjacent to the second fabric 28 of the third component. Preferably, the substrate is a paper comprising from 40 to 70 weight percent of aramid fibers and from 30 to 60 weight percent of polymeric binder. The paper (i) has a dry tensile strength of at least 1225 N/m (7 lb/in) in a first direction and at least 525 N/m (3 lb/in) in a second direction, the second direction being transverse to the first direction,
(ii) has a thickness of from 0.025 to 0.175 mm, and
(iii) has a basis weight of from 20 to 70 gsm.

In one embodiment, a paper substrate comprises from 40 to 70 weight percent of aramid fibers and from 30 to 60 weight percent of binder. In another embodiment, the substrate comprises from 40 to 55 weight percent of aramid fibers and from 45 to 60 weight percent of binder. In some other embodiment, the substrate comprises from 40 to 90 weight percent of aramid fibers and from 10 to 60 weight percent of binder. In yet another embodiment, the substrate comprises from 40 to 60 weight percent of aramid fibers and from 40 to 60 weight percent of binder. A preferred binder is meta-aramid.

The thickness of a paper substrate used in this invention is dependent upon the end use or desired properties of the laminate but, to provide an overall high flexibility and the lowest possible weight, is typically from 1 to 7 mils (0.025 to 0.175 mm) or even from 3 to 7 mils (0.075 to 0.175 mm) thick. The substrate thickness may even be from 4 to 6 mils (0.100 to 0.150 mm). A substrate thickness below 1 mil would result in undesirable features such as a weaker and less dimensionally stable second component, especially when saturated with water. A substrate having a thickness greater than 7 mils would add undesirable weight and stiffness.

In some embodiments, the basis weight of a paper substrate is from 17 to 170 gsm (0.5 to 5.0 oz. per sq. yd.) or from 27 to 47 gsm (0.8 to 1.4 oz. per sq. yd.).

A paper substrate has a dry tensile strength of at least 7 lb/in in a first direction and at least 3 lb/in in a second direction, the second direction being transverse to the first direction. By dry tensile strength we mean the tensile strength of a paper that has been conditioned at ambient temperature and humidity, typically 48-52% Relative Humidity and 22-24 degrees C. TAPPI T-402 sp-08 is an example specification defining ambient conditions for paper, board and pulp products. A dry tensile strength of at least 7 lb/in in a first direction is required to ensure proper handling of the coated web through the subsequent process steps, in particular, to ensure tight roll formation during winding to prevent roll sagging and telescoping.

In some embodiments, a paper substrate has a dry tensile strength of at least 10 lb/in in the first direction and at least 5 lb/in in the second direction.

To aid manufacture of the second component, it is preferable that (i) the paper substrate is hydrophilic. This feature aids the drying process. As the majority of the water from the refractory coating dispersion is absorbed by the substrate, this allows more efficient drying and forming of the inorganic refractory layer as well as preventing drying defects such as blisters in the refractory layer.

(ii) the paper substrate has an air permeability no greater than 600 Gurley Air Resistance (sec/100 cc, 20 oz. cyl). An air permeability of greater than 600 Gurley Air Resistance would adversely affect the drying process of the coated paper. In some embodiments, the paper has an air permeability of from 250 to 350 Gurley Air Resistance (sec/100 cc, 20 oz. cyl.).

(iii) the paper substrate has a wet tensile strength of at least 525 N/m (3 lb/in) in a first direction and at least 350 N/m (2 lb/in) in a second direction, the second direction being transverse to the first direction. In another embodiment, the paper has a wet tensile strength of at least 875 N/m (5 lb/in) in a first direction and at least 350 N/m (2 lb/in) in a second direction, the second direction being transverse to the first direction. In a preferred embodiment the first direction is the long direction within the plane of the paper, that is, the direction in which the roll of paper has been made. This is also known as the machine direction. The second direction is sometimes known as the cross direction. By wet tensile strength we mean the tensile strength of the paper after saturation with water. If the wet tensile strength is less than 525 N/m (3 lb/in) in a first direction, there is a high risk of frequent sheet breaks during the coating process due to the weight being deposited on the paper and the tension applied to the paper, (iv) the paper substrate has a surface smoothness on the surface that is in contact with the refractory layer of no less than 250 Sheffield units, Smoothness is concerned with the surface contour of paper. It is the flatness of the surface under testing conditions which considers roughness, levelness, and compressibility. This test is an indirect measure of paper smoothness or roughness. The Sheffield test method is a measurement of air flow between the test specimen (backed by flat glass on the bottom side) and two pressurized, concentric annular lands that are impressed in to the sample from top. Such a procedure is described in TAPPI T-538 om-08. In some embodiments, the substrate has a surface smoothness on at least one surface of from 300 to 400 Sheffield units, and (v) the paper substrate has a density of from 0.25 to 0.6 g/cc or from 0.25 to 0.45 g/cc or even from 0.30 to 0.40 g/cc. A substrate density of below 0.25 g/cc would result in undesirable features such as a weaker fluffy and excessively open structure. For papers with over 30 weight percent of polymeric binder, a substrate density of greater than 0.6 g/cc would require an excessive densification that would alter both surface properties (i.e. higher smoothness) and air permeability of the densified paper. Increased surface smoothness of the densified substrate would result in a lower release value potentially leading to inorganic refractory layer peeling off the densified substrate with a risk of breaks in the refractory layer. Lower air permeability would hinder the drying process of the coated paper.

The aramid fibers of the paper may be meta-aramid, para-aramid or a combination of the two.

The high temperature properties of the aramid fibers ensure thermal and mechanical stability of the paper substrate during processing steps when the substrate can be exposed to a temperature of 150 degrees C. for at least 10 minutes, that is to say, that the paper will not change dimensions when subjected to a temperature of 150 degrees C. for at least 10 minutes.

The aramid fibers of the paper can be in the form of floc, pulp, or a combination of thereof. As employed herein the term aramid means a polyamide wherein at least 85% of the amide (—CONH—) linkages are attached directly to two aromatic rings. Additives can be used with the aramid. In fact, it has been found that up to as much as 10 percent, by weight, of other polymeric material can be blended with the aramid or that copolymers can be used having as much as 10 percent of other diamine substituted for the diamine of the aramid or as much as 10 percent of other diacid chloride substituted for the diacid chloride of the aramid.

Floc is generally made by cutting continuous spun filaments into specific-length pieces. If the floc length is less than 2 millimeters, it is generally too short to provide a paper with adequate strength; if the floc length is more than 25 millimeters, it is very difficult to form uniform wet-laid webs. Floc having a diameter of less than 5 micrometers, and especially less than 3 micrometers, is difficult to produce with adequate cross sectional uniformity and reproducibility; if the floc diameter is more than 20 micrometers, it is very difficult to form uniform papers of light to medium basis weights.

The term "pulp", as used herein, means particles of fibrous material having a stalk and fibrils extending generally therefrom, wherein the stalk is generally columnar and 10 to 50 micrometers in diameter and the fibrils are fine, hair-like members generally attached to the stalk measuring only a fraction of a micrometer or a few micrometers in diameter and 10 to 100 micrometers long. Aramid fiber floc is of a similar length to carbon fiber floc. Both meta and para aramid fibers are suitable and are available from E.I. DuPont de Nemours, Wilmington, Del. (DuPont) under the tradenames Kevlar® and Nomex® and from Teijin Twaron, Conyers, Ga. under the tradename Twaron®.

A preferred pulp material is p-aramid. However a blend of p-aramid with other synthetic or natural fibers such as liquid crystal polyester, polyareneazole, meta-aramid, and cellulose can be utilized. One illustrative process for making aramid pulp is disclosed in U.S. Pat. No. 5,084,136 to Haines et al.

Different thermoset and thermoplastic resins can be used as a polymeric binder in the paper of this invention. These resins can be supplied in the form of fibrids, flakes, powder, and floc. The term "fibrids" as used herein, means a very finely-divided polymer product of small, filmy, essentially two-dimensional, particles known having a length and width of 100 to 1000 micrometers and a thickness of 0.1 to 1 micrometer. Preferable types of binder resins are aramids, polyimides, phenolics, and epoxies. However, other types of the resins can also be used.

Fibrids are typically made by streaming a polymer solution into a coagulating bath of liquid that is immiscible with the solvent of the solution. The stream of polymer solution is subjected to strenuous shearing forces and turbulence as the polymer is coagulated. The fibrid material of this invention can be selected from meta or para-aramid or blends thereof. More preferably, the fibrid is a meta-aramid.

The paper can include inorganic particles such as mica, vermiculite, ceramic fiber and blends thereof. Alumina-silicate fiber is an example of a ceramic fiber. For example, Nomex® 418 and Nomex® 419 are papers available from DuPont comprising a blend of m-aramid fibers and mica, the mica being present in an amount of about 50 weight percent. The addition of these performance enhancing additives is to impart properties such as improved fire resistance, thermal conductivity, dimensional stability, and the like to the paper and the composite sheet.

Exemplary combinations of fibrids and floc include m-aramid fibrids and m-aramid floc; m-aramid fibrids and p-aramid floc; m-aramid fibrids and a blend of p-aramid floc and polethyleneterephthalate (PET) floc; p-aramid fibrids and p-aramid floc; and p-aramid fibrids with p-aramid pulp and p-aramid floc.

In one preferred embodiment, the fiber and the polymer binder in the form of fibrids can be slurried together to form a mix that is converted to paper on a wire screen or belt. Reference is made to U.S. Pat. Nos. 4,698,267 and 4,729,921 to Tokarsky; U.S. Pat. No. 5,026,456 to Hesler et al.; U.S. Pat. Nos. 5,223,094 and 5,314,742 to Kirayoglu et al for illustrative processes for forming papers from aramid fibers and aramid fibrids.

Once the paper is formed, it may be calendered to the desired void content/apparent density.

Another form of substrate includes a nonwoven fibrous sheet comprising fibers wherein the fibers are glass, aramid, crystalline ceramic oxide (including quartz), silicon nitride, silicon carbide, oxidized polyacrylonitrile, carbon, and combinations thereof.

Figure 2D:
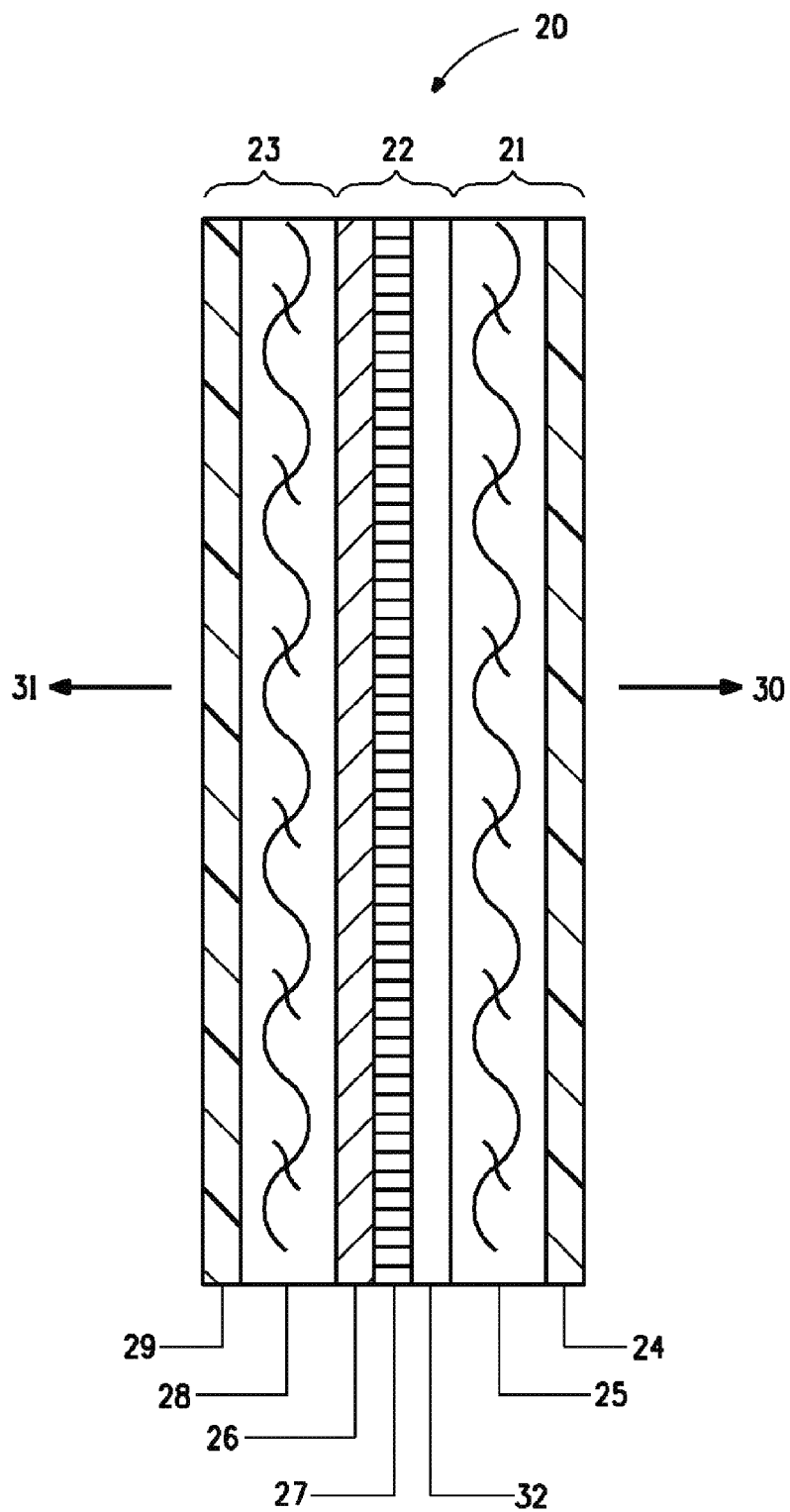

In some embodiments, as shown in FIGS. 2B and 2D, the second component may include a protective polymeric layer 32 in contact with the refractory layer 27. Such a protective polymeric layer provides mechanical reinforcement and protection to the refractory layer during manufacturing, installation and service. In a preferred embodiment, the protective polymeric layer is in a form of a self-supporting film.

In some embodiments, the protective polymeric layer 32 may be bonded to the refractory layer 27 by means such as an adhesive or thermal bonding. In some embodiments, the bond strength between the protective polymeric layer and the refractory layer is at least 44 N/m (0.25 lb/in). In another embodiment, the bond strength between the protective polymeric layer and the refractory layer is at least 140 N/m (0.8 lb/in) or even at least 262 N/m (1.5 lb/in.).

The protective polymeric layer 32 must be capable of withstanding a temperature of at least 200 degrees C. for at least 10 min. The polymeric layer may be a thermoset or thermoplastic material. A thermoplastic layer is preferred.

Preferably the protective layer 32 should have a UL 94 flame classification of V-0. UL 94 flame classification is an Underwriters Laboratory test, The Standard for Flammability of Plastic Materials for Parts in Devices and Appliances, which measures a material's tendency either to extinguish or to spread the flame once the specimen has been ignited. V-0 indicates that the material is tested in a vertical position and self-extinguished within ten seconds after the ignition source is removed.

Preferably, the protective layer has a thickness in the range of from 4 to 30 micrometers. More preferably the thickness range should be from 5 to 15 micrometers and most preferably in the range from 5 to 7 micrometers. The layer further provides mechanical strength and stiffness to the laminate.

Suitable materials for the protective layer include polyketone, polyimide, polysulfone, polyarylene sulfide, fluoropolymers, liquid crystal polymers and polycarbonate. Examples of polyketone are polyetheretherketone (PEEK) and polyetherketoneketone (PEKK). Polyethersulfone and polyphenylsulfone are examples of polysulfone. Poly(p-phenylene sulfide is a suitable polyarylene sulfide for use in this invention. Polyvinylfluoride (PVF) and polyvinylidinefluoride (PVDF) are examples of fluoropolymers. A suitable fluoropolymer is available from DuPont under the tradename Tedlar. Polyarylate is an example of a suitable liquid crystal polymer. Some of these films may also be coated with a second polymeric material. For example, a polyimide film, Kapton®, may be coated with fluorinated ethylene propylene, FEP and used in this invention.

The surface of the protective layer 32 may optionally be treated to improve adhesion with another substrate such as an adhesive. Suitable surface treatment methods include, but are not limited to, corona etching and washing with coupling agents such as ammonium, phosphonium or sulfonium salts. Where the protective layer is adhesively bonded to the refractory layer 27 and the fabric layer 28, the adhesive may be a thermoplastic or thermoset resin. Thermoset resins include epoxy, epoxy novolac, phenolic, polyurethane, and polyimide. Thermoplastic resins include polyester, polyetherketone, polyetheretherketone, polyetherketoneketone, polyethersulfone, and polyolefin. Thermoplastic resins are preferred.

To prevent possible damage from mechanical stressing exerted by a shrinking or melting or disintegrating protective polymeric layer on the inorganic refractory layer during a flame propagating event, it is preferred that inter-ply bond of the composite laminate would fail (i.e. release or melt or soften) in the early stage of the flame exposure thus causing internal debonding of the composite laminate. That is to say, delamination of the refractory layer from the protective film will occur before the protective film starts disintegrating. Due to their relatively low activation temperatures, thermoplastic adhesives are a preferred choice over thermoset adhesives as they will facilitate effective delamination.

The adhesive layer used to bond the protective layer to the refractory layer may optionally contain up to 40 weight percent of a flame retardant ingredient. Suitable flame retardant ingredients include antimony trioxide, halogenated flame retardants including tetrabromobisphenol A, polybrominated biphenyls, pentabrominateddiphenylether(oxide), octabrominateddiphenylether(oxide), decabrominateddiphenylether(oxide) and hexabromocyclododecane. Phosphorus containing flame retardants are also widely used.

Preferably, the adhesive should be capable of activation at a temperature in the range of 75 to 200 degrees C. In some embodiments, the activation range is from 120 to 140 degrees C. By activation we mean that for a thermoset resin, the resin must bond to the polymeric layer and the fabric within the specified temperature range. For a thermoplastic resin, activation means that the resin softens and flows sufficiently to bond to the polymeric layer and the fabric.

Inorganic Refractory Layer

Figure 1B:
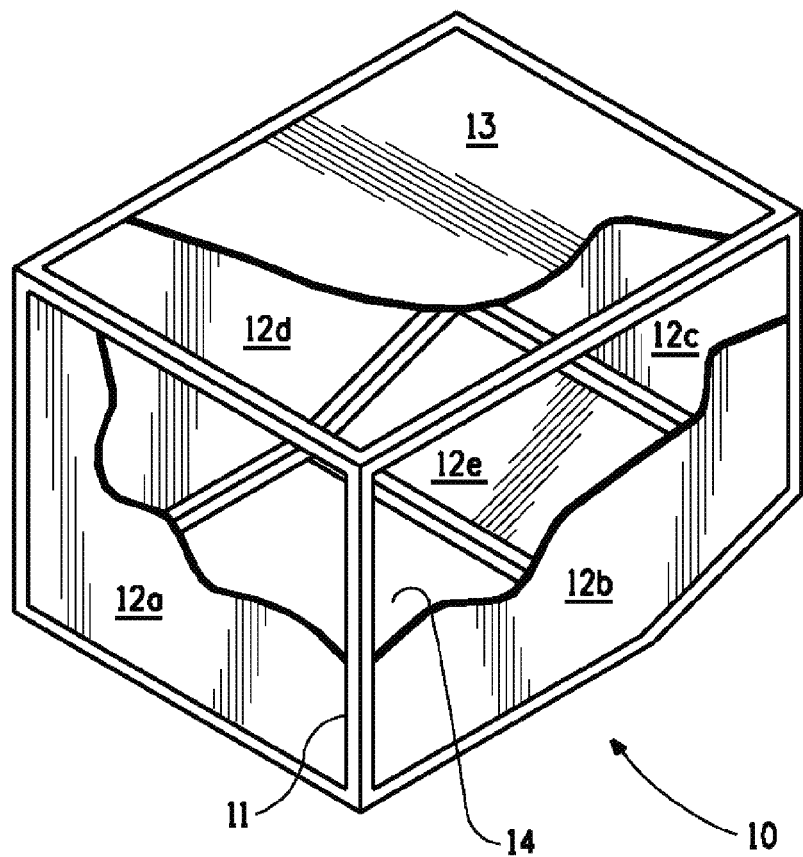

The inorganic refractory layer, shown as 12 in FIG. 1, is adjacent to at least one surface of the substrate. Preferably, the refractory layer has a dry areal weight of from 15 to 50 gsm or even from 20 to 35 gsm. Preferably the refractory layer has a residual moisture content of no greater than 10 percent by weight, more preferably no greater than 3 percent by weight.

The refractory layer comprises platelets. Preferably at least 85% of the layer comprises platelets, more preferably at least 90% and most preferably at least 95%. In some embodiments, platelets comprise 100% of the layer. The refractory layer may comprise some residual dispersant arising from incomplete drying of the platelet dispersion during manufacture.

The refractory layer has a thickness of from 7.0 to 76 micrometers and more preferably from 7.0 to 50 micrometers. Preferably, the layer has a UL 94 flame classification of V-0. The function of the refractory layer, in which adjacent platelets overlap, is to provide a flame and hot gas impermeable barrier. The inorganic platelets may be clay, such as montmorillonite, vermiculite, mica, talc and combinations thereof.

Preferably, the inorganic oxide platelets are stable (i.e., do not burn, melt or decompose) at about 600 degrees C., more preferably at about 800 degrees C. and most preferably at about 1000 degrees C. Vermiculite is a preferred platelet material for the refractory layer. Vermiculite is a hydrated magnesium aluminosilicate micaceous mineral found in nature as a multilayer crystal. Vermiculite typically comprises by (dry) weight, on a theoretical oxide basis, about 38-46% $SiO_2$, about 16-24% MgO, about 11-16% $Al_2O_3$, about 8-13% $Fe_2O_3$ and the remainder generally oxides of K, Ca, Ti, Mn, Cr, Na, and Ba. "Exfoliated" vermiculite refers to vermiculite that has been treated, chemically or with heat, to expand and separate the layers of the crystal, yielding high aspect ratio vermiculite platelets. Suitable vermiculite materials are available from Specialty Vermiculite Products under the trade designations MicroLite 963 and MicroLite 963HS The thickness of an individual platelet typically ranges from about 5 Angstroms to about 5,000 Angstroms more preferably from about 10 Angstroms to about 4,200 Angstroms. The mean value of the maximum width of a platelet typically ranges from about 10,000 Angstroms to about 30,000 Angstroms. The aspect ratio of an individual platelet typically ranges from 100 to 20,000.

Preferably, the platelets have an average diameter of from 15 to 25 micrometers. In some other embodiments, the platelets have an average diameter of from 18 to 23 micrometers.

In a preferred embodiment, the refractory layer further comprises cations arising from contact, at a temperature of from 10 to 50 degrees C., with an aqueous cationic rich solution at a cation concentration of from 0.25 to 2N. The contact with the cationic solution occurs prior to assembling the refractory layer into a composite laminate. This cationic treatment provides enhanced stability to the refractory layer on exposure to fluids.

In some embodiments of this invention, the inorganic platelet layer may be reinforced by a lightweight open weave fabric scrim either laid onto a single platelet layer or placed between two layers of platelets so as to provide additional mechanical strength to the layer. The scrim can be made from natural, organic or inorganic fibers with glass, cotton, nylon or polyester being typical examples. A glass fiber scrim is particularly preferred. The scrim may be a woven or knit structure and has a typical areal weight not exceeding 40 grams per square meter.

Preferably the refractory layer is continuous. By continuous is meant that the layer is capable of being wound onto a roll without breaking apart. In some embodiments, the refractory layer is perforated to enhance bonding to an adhesive layer during subsequent processing. The extent of perforation is determined by experimentation. Preferably, in order to prevent compromising flame barrier properties, an individual perforation should not exceed 2 millimeters in maximum dimension. In a preferable embodiment, individual perforations should be spaced at least 10 millimeters apart. The shape of the perforations is not critical, Suitable perforations include circles, squares, rectangles, ovals and chevrons.

The bond strength between the refractory layer and the surface of the paper is at least 43 N/m (0.25 lb/in), preferably at least 14 N/m (0.8 lb/in), If the bond strength is less than 43 N/m (0.25 lb/in), the inorganic refractory layer can peel off the substrate with a risk of breaks in the refractory layer. A bond strength of at least 140 N/m (0.8 lb/in) ensures that the inorganic refractory layer does not separate from the substrate either during subsequent process steps or, once put in service, during the life span of the intended application. Bond strength is sometimes referred to as Release Value. In this instance, it is the Release Value between the surface of the paper and the intumescent coating applied to the paper.

Third Component

The third component 23 has an areal density of from 88 to 678 gsm (2.6 to 20 oz. per sq. yd.) and comprises a second fabric 28 of filamentary yarns having a tenacity of at least 11 grams per dtex (10 grams per denier) and a second polymeric layer 29, the second fabric of the third component being adjacent to the refractory layer of the second component. The second polymeric layer is the innermost layer of the composite sheet. The second polymeric layer provides enhanced abrasion/scuff and puncture resistance, improved impact toughness as well as an enhanced resistance to both physical mistreatment, chemical contact attack and permeation by liquids.

Preferably, the second polymeric layer maintains its toughness and flexibility over a wide temperature range, even at temperatures as low as (−50° C. (−60° F.)), over the life span of the end product.

In some embodiments, the second fabric layer may be bonded to the second polymeric layer by means such as an adhesive, thermal bonding or by fasteners.

When an adhesive is used the adhesive layer may be a thermoplastic or thermoset resin. Thermoset resins include epoxy, epoxy novolac, phenolic, polyurethane, and polyimide. Thermoplastic resins include polyester, polyetherketone, polyetheretherketone, polyetherketoneketone, polyethersulfone, and polyolefin. Thermoplastic resins are preferred. The adhesive may optionally contain up to 40 weight percent of a flame retardant ingredient. Suitable flame retardant ingredients include antimony trioxide, halogenated flame retardants including tetrabromobisphenol A, polybrominated biphenyls, Penta-, Octa-, Decabrominated diphenyl ether (oxide) and hexabromocyclododecane. Phosphorus containing flame retardants are also widely used.

The adhesive must be capable of activation at a temperature in the range of 75 to 200 degrees C. In some embodiments, the activation range is from 120 to 140 degrees C. By activation we mean that for a thermoset resin, the resin must bond to the polymeric layer and the fabric within the specified temperature range. For a thermoplastic resin, activation means that the resin softens and flows sufficiently to bond to the polymeric layer and the fabric. The adhesive bond between the second polymeric layer and the second fabric is at least 263 N/m (1.5 lb/in). In some embodiments, the adhesive bond between the second polymeric layer and the second fabric is at least 315 N/m (1.8 lb/in), or even 876 N/m (5 lb/in).

In some embodiments, the bond strength between the second fabric 28 and the second polymeric layer 29 is at least 263 N/m (1.5 lb/in). In another embodiments, the bond strength between the second fabric and the second polymeric layer is at least 315 N/m (1.8 lb/in).

In some embodiments the second fabric may be optionally treated on one or both sides with an inorganic coating such as a ceramic.

First and Second Fabrics

In some embodiments the first or second fabrics have an areal weight of from 70 to 508 gsm (2.1 to 15 oz. per sq. yd.). In some other embodiments, the fabric areal weight is from 101 to 373 gsm (3 to 11 oz. per sq. yd.). In some embodiments, the first fabric has an areal weight of from 101 to 170 gsm (3 to 5 oz. per sq. yd.). In some embodiments, the second fabric has an areal weight of from 170 to 270 gsm (5 to 8 oz. per sq. yd.).

The first or second fabrics may be woven or non-woven. Typical woven fabric styles are plain, basket, leno twill or satin weaves. In one embodiment, the first fabric is a plain weave fabric comprising 555 dtex (500 denier) KM2+ p-aramid yarns in an amount of 11 ends per cm (28 ends per inch) in both warp and weft directions. In another embodiment, the second fabric is a plain weave fabric comprising 1111 dtex (1000 denier) KM2 p-aramid yarns in an amount of 9.4 ends per cm (24 ends per inch) in both warp and weft directions.

Fine denier yarn of the fabric combined with a tough polymeric film leads to a significant enhancement in puncture resistance, and thus overall durability, of the non-rigid composite sheet.

Nonwoven fabrics include fabrics in which the filaments are arranged in a random orientation or fabrics comprising filaments that are aligned in only one direction. This latter type of fabric is also known as a non-crimped or unidirectional fabric.

In some embodiments the first and/or second fabrics are scoured or heat cleaned after weaving. Such processes are well known in the textile industry to remove contaminants such as oil from the weaving process.

Preferably, the filamentary yarns of the first and second fabrics comprise aromatic polyamide or aromatic copolyamide. Glass fiber and carbon fiber, especially carbon fiber based on polyacrylonitrile, may also be used.

The fabrics 25 and 28 are made from multifilament yarns having a plurality of filaments. The yarns can be intertwined and/or twisted. For purposes herein, the term "filament" is defined as a relatively flexible, macroscopically homogeneous body having a high ratio of length to width across its cross-sectional area perpendicular to its length. The filament cross section can be any shape, but is typically circular or bean shaped. Herein, the term "fiber" is used interchangeably with the term "filament", and the term "end" is used interchangeably with the term "yarn".

The filaments can be any length. Preferably the filaments are continuous. Multifilament yarn spun onto a bobbin in a package contains a plurality of continuous filaments. The multifilament yarn can be cut into staple fibers and made into a spun staple yarn suitable for use in the present invention. The staple fiber can have a length of about 1.5 to about 5 inches (about 3.8 cm to about 12.7 cm). The staple fiber can be straight (i.e., non crimped) or crimped to have a saw tooth shaped crimp along its length, with a crimp (or repeating bend) frequency of about 3.5 to about 18 crimps per inch (about 1.4 to about 7.1 crimps per cm).

In some embodiments, the yarns have a yarn tenacity of at least 11 grams per dtex and a modulus of at least 100 grams per dtex. In some embodiments, the yarns have a linear density of from 333 to 2222 dtex (300 to 2000 denier) or from 555 to 1111 dtex (500 to 1000 denier). In some embodiments, the yarns of the first or second fabrics have a linear density of 555 dtex or of 1111 dtex.

When the polymer is polyamide, aramid is preferred. The term "aramid" means a polyamide wherein at least 85% of the amide (—CONH—) linkages are attached directly to two aromatic rings. Suitable aramid fibers are described in Man-Made Fibres—Science and Technology, Volume 2, Section titled Fibre-Forming Aromatic Polyamides, page 297, W. Black et al., Interscience Publishers, 1968. Aramid fibers and their production are, also, disclosed in U.S. Pat. Nos. 3,767,756; 4,172,938; 3,869,429; 3,869,430; 3,819,587; 3,673,143; 3,354,127; and 3,094,511.

The preferred aramid is a para-aramid. The preferred para-aramid is poly(p-phenylene terephthalamide) which is called PPD-T. By PPD-T is meant the homopolymer resulting from mole-for-mole polymerization of p-phenylene diamine and terephthaloyl chloride and, also, copolymers resulting from incorporation of small amounts of other diamines with the p-phenylene diamine and of small amounts of other diacid chlorides with the terephthaloyl chloride. As a general rule, other diamines and other diacid chlorides can be used in amounts up to as much as about 10 mole percent of the p-phenylene diamine or the terephthaloyl chloride, or perhaps slightly higher, provided only that the other diamines and diacid chlorides have no reactive groups which interfere with the polymerization reaction. PPD-T, also, means copolymers resulting from incorporation of other aromatic diamines and other aromatic diacid chlorides such as, for example, 2,6-naphthaloyl chloride or chloro- or dichloroterephthaloyl chloride or 3,4'-diaminodiphenylether.

Additives can be used with the aramid and it has been found that up to as much as 10 percent or more, by weight, of other polymeric material can be blended with the aramid. Copolymers can be used having as much as 10 percent or more of other diamine substituted for the diamine of the aramid or as much as 10 percent or more of other diacid chloride substituted for the diacid chloride or the aramid.

Another suitable fiber is one based on aromatic copolyamide prepared by reaction of terephthaloyl chloride (TPA) with a 50/50 mole ratio of p-phenylene diamine (PPD) and 3,4'-diaminodiphenyl ether is (DPE). Yet another suitable fiber is that formed by polycondensation reaction of two diamines, p-phenylene diamine and 5-amino-2-(p-aminophenyl) benzimidazole with terephthalic acid or anhydrides or acid chloride derivatives of these monomers.

Glass fibers include "E" glass and "S" Glass. E-Glass is a commercially available low alkali glass. One typical composition consists of 54 weight % $SiO_2$, 14 weight % $Al_2O_3$, 22 weight % CaO/MgO, 10 weight % $B_2O_3$ and less then 2 weight % $Na_2O/K_2O$, Some other materials may also be present at impurity levels S-Glass is a commercially available magnesia-alumina-silicate glass. This composition is stiffer, stronger and more expensive than E-glass and is commonly used in polymer matrix composites.

In some embodiments the carbon fiber is a standard or intermediate modulus fiber such as those available under the tradename Torayca or HexTow from Toray Industries or Hexcel Corporation. Typically, such fibers have 3,000 or 6,000 or 12,000 or 24,000 filaments per tow.

In some embodiments first and/or second fabrics may optionally be treated with a flame retardant ingredient to aid flame propagation properties of the non-rigid Flame Resistant Composite. Suitable flame retardant ingredients include antimony trioxide, halogenated flame retardants including tetrabromobisphenol A, polybrominated biphenyls, pentabrominateddiphenylether(oxide), octabrominateddiphenylether(oxide), decabrominateddiphenylether(oxide) and hexabromocyclododecane. Phosphorus containing flame retardants are also widely used.

First and Second Polymeric Layers

The polymer of the first or second or both polymeric layers may be a thermoplastic or thermoset polymer. A thermoplastic polymer is preferred.

In a preferred embodiment, the first and second polymeric layers are in a form of a self-supporting film.

Suitable polymers include polyurethane, polyethylene, polypropylene, polyethylenenaphthalate, polyacrylonitrile, fluoropolymer, polyimide, polyketone, polyimide (Kapton®), polysulfone, polyarlene sulfide, liquid crystal polymer, polycarbonate, and ionomers such as ethylenemethacrylic acid copolymer (E/MAA).

Exemplary fluoropolymers include polyvinylfluoride (Tedlar®), etyhylenechlorotrifluoroethylene copolymer (Halar®) and polytetrafluoroethylene (Teflon®). Exemplary polyketones include polyetheretherketone (PEEK) and polyetherketoneketone (PEKK).

In one embodiment, the first polymeric layer is polyurethane. In another embodiment, the second polymeric layer is an ionomeric resin such as ethylenemethacrylic acid copolymer. In yet another embodiment, the first polymeric layer is non-transparent and impervious to UV rays. By non-transparent and impervious to UV rays we mean that the first polymeric layer blocks at least 95% of UV rays, more preferably at least 98% and most preferably 100% of UV rays especially those rays at the upper end of the UV spectrum.

In some embodiments the first and/or second polymeric layers have an areal weight of 17 to 170 gsm (0.5 to 5 oz. per sq. yd.) or from 34 to 136 gsm (1 to 4 oz. per sq. yd.) or even from 67 to 102 gsm (2 to 3 oz. per sq. yd.).

In some embodiments, at least one surface of the first and/or second polymeric layers may be metalized. Preferably in the composite sheet, the metalized surface is on the side of the polymeric layer adjacent to the first or second fabrics.

Test Methods

Flame penetration was measured according to 14 CFR 25.855 Appendix F Part III—Test Method To Determine Flame Penetration Resistance of Cargo Compartment Liner (ceiling position)

Tensile properties of the composite sheet were determined by ASTM D3039/D3039M-08 Standard Test Method for Tensile Properties of Polymer Matrix Composite Materials.

The dry tensile strength of the substrate was measured according to TAPPI T494 om-06 Tensile Properties of Paper and Paperboard (Using Constant Rate of Elongation Apparatus).

The thickness of the substrate was measured by TAPPI T411 om-10 Thickness (Caliper) of Paper, Paperboard, and Combined Board.

The dimensional stability of the substrate was rated based on its ability to hold flat (i.e. no moisture related wrinkles or creases) for at least 2 minutes when exposed to one-sided wetting.

The dry areal weight of the refractory layer was measured according to ISO 536 (1995) Determination of Grammage and TAPPI T 410 Grammage of Paper and Paperboard (Weight per Unit Area).

The moisture content of the refractory layer was measured according to ISO 287 (1985) Determination of Moisture Content—Oven Drying Method.

The composite sheets were subjected to a flame test that replicated the temperature and air mass flux test conditions of test method FAA FAR 25.856(b), App. F, Part VII. The somewhat lower heat flux was compensated with a higher air mass flux to replicate a required thermo-mechanical stress level to be exerted on the flame barrier composites during the burnthrough test.

EXAMPLES

Example 1

A non-rigid composite sheet was prepared.

First Component

The first component comprised a woven fabric (first fabric) thermally bonded to a non-transparent 0.075 mm (3 mil) blown polyurethane film (first polymeric layer). The fabric had an areal weight of 125 gsm (3.7 oz./sq. yd.). The fabric was a plain weave having 28 ends per inch in both warp and weft and was woven from 556 dtex (500 denier) p-aramid Kevlar® KM2+ yarns, merge 1W034. The bond strength between first polymeric film and first fabric was tested to be at least 437 N/m (2.5 lbs/in).

Second Component

The second component comprised a refractory layer of vermiculite on 0.125 mm (5 mil) Nomex® grade 413 paper substrate. 30 gsm of vermiculite was coated onto the paper and subsequently treated with a 0.25N cationic dispersion of sodium chloride.

The vermiculite used was an aqueous dispersion of Microlite® 963HS obtained from Specialty Vermiculite Corporation, Enoree, S.C.

Third Component

The third component comprised a woven fabric (second fabric) thermally bonded to a 0.075 mm (3 mil) ionomeric Surlyn® film (second polymeric layer). The fabric had an areal weight of 220 gsm (6.5 oz./sq. yd). The fabric was a plain weave having 24 ends per inch (9.4 ends/cm) in both warp and weft and was woven from 1111 dtex (1000 denier) p-aramid Kevlar® KM2 yarns, merge 1W041. The bond strength between first polymeric film and first fabric was tested to be at least 262 N/m (1.5 lbs/in).

The first, second and third components were assembled together as shown in FIG. 2A. Component 2 was not bonded to either component 1 or component 3. For ease of handling all three components were sewn together along their edges with Kevlar® thread.

The fabricated composite sheet was subjected, in a ceiling position, to the FAA flame penetration test 14 CFR 25.855. The flame was applied on the Surlyn® film side of the composite. The sample showed a good resistance to flame penetration, with the inorganic refractory layer acting as an effective barrier to 927° C., +/−38° C. (1700° F., +/−100° F.)—flame with no flame penetration of the specimen within 5 minutes after application of the flame source. The peak temperature measured at 4 inches above the upper surface of the horizontal test sample did not exceed 204° C. (400° F.).

The composite sheet was also tested to comply with smoke & emission requirements as per14 CFR 25.853(d), Appendix F, Part V for smoke emission and to BSS 7239, Revision A for toxic gas determination. The results were deemed to be acceptable.

The mechanical strength of the composite sheet was also tested to comply with durability standards set by National Aerospace Standard NAS 3610 for materials used for air cargo Unit Load Devices. The axial tensile strength of 101.6 mm (4 inch) wide strips of the composite sheet was 1,700+/−50 lbs or 771+/−22 kg (425+/−12.5 lb/in or 74228+/−2189 N/m).

Comparative Example A

A composite sheet was fabricated comprising a 322 gsm (9.5 oz./sq. yd). woven fabric thermally bonded between the 0.075 mm (3 mil) polyurethane (first polymeric layer) and the 0.075 mm (3 mil) Surlyn® (second polymeric layer) films of Example 1. The bond strength between the PU film and fabric was at least 437 N/m (2.5 lbs/in). The fabric was a plain weave having 24 ends per inch (94 ends per cm) in both warp and weft and was woven from 1667 dtex (1500 denier) p-aramid Kevlar® 29 yarns, merge 1F211. The axial tensile strength of a 101.6 mm (4 inch) wide strip of the single layer composite was no greater than 900 lbs or 408 kg (225 lb/in or 39403 N/m).

Comparable Example A was tested as complying with flammability requirements of TSO C90a Cargo Pallets, Nets and Containers (Unit Load Devices) specification for vertical and horizontal flame propagation. However, it lacked any effective flame barrier properties as, when exposed to flame, the sample failed flame penetration within 30 seconds after application of the flame source.

Example 2

This example was prepared as per Example 1 except that a thermoplastic film protective layer 32 was thermally bonded to the open face of the refractory layer of the second component. This construction as is shown in FIG. 2B. The thermoplastic protective film was a 0.021 mm (0.85 mil) gray Tedlar® SP PVF film, grade GY85SL2, available from DuPont.

The composite sheet of Example 2 was subjected, in a ceiling position, to the FAA flame penetration test 14 CFR 25.855. The flame was applied on the Surlyn® film side of the composite. The sample showed a good resistance to flame penetration, with the inorganic refractory layer acting as an effective barrier to 927° C., +/−38° C. (1700° F., +/−100° F.)—flame with no flame penetration of the specimen within 5 minutes after application of the flame source. The peak temperature measured at 4 inches above the upper surface of the horizontal test sample did not exceed 204° C. (400° F.).

Example 3

First Component

The first component comprised a woven fabric (first fabric) thermally bonded to a non-transparent 0.075 mm (3 mil) blown polyurethane film (first polymeric layer). The fabric had an areal weight of 220 gsm (6.5 oz./sq. yd). The fabric was a plain weave having 24 ends per inch (9.4 ends per cm) in both warp and weft and was woven from 1111 dtex (1000 denier) p-aramid Kevlar® KM2 yarns, merge 1W041. The bond strength between first polymeric film and first fabric was tested to be at least 437 N/m (2.5 lb/in).

Second Component

The second component comprised a refractory layer of vermiculite on 0.125 mm (5 mil) Nomex® grade 413 paper substrate. 30 gsm of vermiculite was coated onto the paper and subsequently treated with a 0.25N cationic dispersion of sodium chloride.

The vermiculite used was an aqueous dispersion of Microlite® 963HS

Third Component

The third component comprised) ionomeric Surlyn® film (second polymeric layer). The fabric had an areal weight of 125 gsm (3.7 oz./sq. yd). The fabric was a plain weave having 28 ends per inch (11 ends per cm) in both warp and weft and was woven from 556 dtex (500 denier) p-aramid Kevlar® KM2+ yarns, merge 1W034. The bond strength between first polymeric film and first fabric was tested to be at least 262 N/m (1.5 lb/in).

The first, second and third components were assembled together as shown in FIG. 2A. Component 2 was not bonded to either component 1 or component 3. For ease of handling all three components were sewn together along their edges with Kevlar® thread.

A composite sheet of this example showed similar resistance to flame penetration and had a similar axial tensile strength as the composite sheet of Example 1.

What is claimed is:

1. A non-rigid composite sheet comprising in order
   (i) a first component having an areal density of from 88 to 678 gsm comprising a first woven fabric of continuous filament yarns, the yarns having a tenacity of at least 11 g/dtex and a first polymeric layer,
   (ii) a second component having an areal density of from 30 to 237 gsm comprising a substrate and an inorganic refractory layer, and
   (iii) a third component having an areal density of from 88 to 678 gsm comprising a second woven fabric of continuous filament yarns, the yarns having a tenacity of at least 11 g/dtex and a second polymeric layer, the second fabric of the third component being adjacent to the refractory layer of the second component, wherein
   (a) the yarns of the first and second fabrics comprise aromatic polyamide, aromatic copolyamide, glass fiber or carbon fiber,
   (b) the polymer of the first polymeric layer of the first component and second polymeric layer of the third component is polyurethane, polyethylene, polypropylene, polyethylenenaphthalate, polyacrylonitrile, fluoropolymer, polyimide, polyketone, polyimide, polysulfone, polyarlene sulfide, liquid crystal polymer, polycarbonate or an ionomer,
   (c) the substrate of the second component is a nonwoven fibrous sheet comprising fibers wherein the fibers are glass, aramid, crystalline ceramic oxide, silicon nitride, silicon carbide, oxidized polyacrylonitrile, carbon, and combinations thereof, or a paper comprising from 40 to 70 weight percent of aramid fibers and from 30 to 60 weight percent of polymeric binder,
   (d) the first polymeric layer blocks at least 95% of UV rays,
   (e) the first and second fabrics individually have an areal weight of from 70-508 qsm,
   (f) the inorganic refractory layer of (ii) comprises platelets, and
   (g) the composite sheet is either a sidewall or a ceiling of a cargo container or both.

2. The composite sheet of claim 1, wherein the composite has a break strength of at least 350 N/cm.

3. The composite sheet of claim 1, wherein the composite sheet can withstand a flame temperature of 927° C. for 5 minutes without burn-through penetration when tested according to FAA test method 14 CFR 25.855 Appendix F Part III.

4. The composite sheet of claim 1, wherein the composite sheet can withstand a flame temperature of 927° C. for 5 min without burn-through penetration and the temperature 101 mm away from the side of the sheet remote from the flame does not exceed 204° C. when tested according to FAA test method 14 CFR 25.855 Appendix F Part III.

5. The composite sheet of claim 1, wherein the first fabric has an areal weight from 101 to 170 gsm.

6. The composite sheet of claim 1, wherein the second fabric has an areal weight from 170 to 270 gsm.

7. The composite sheet of claim 1, wherein the filamentary yarns of the first and/or second fabrics comprise have a linear density of from 333 to 2222 dtex.

8. The composite sheet of claim 1, wherein the refractory layer comprises vermiculite.

9. The composite sheet of claim 1 wherein the refractory layer has a dry areal weight of from 15 to 50 gsm.

10. The composite sheet of claim 1 wherein the inorganic refractory layer has a moisture content of no greater than 10%.

11. The polymer of claim 1 wherein the ionomer is ethylenemethacrylic acid copolymer.

* * * * *